UNITED STATES PATENT OFFICE.

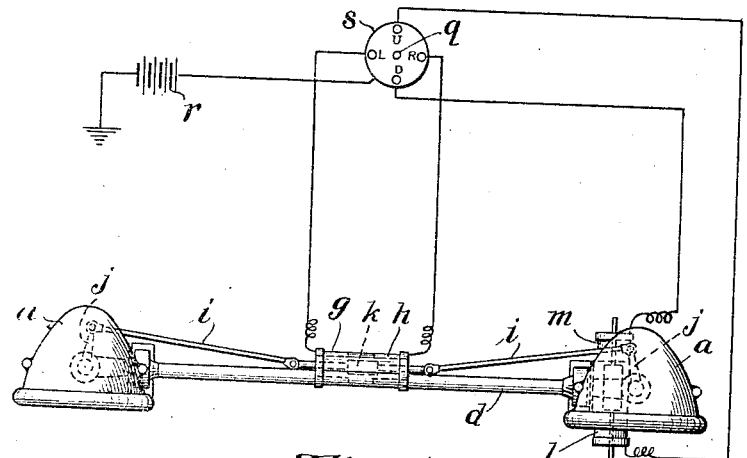
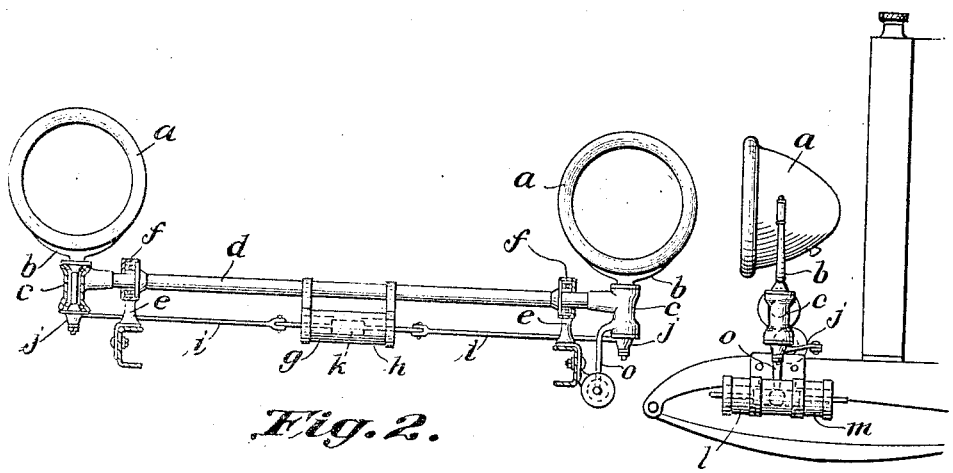
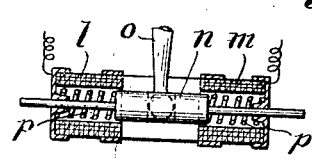

FREDERICK F. JOHN, OF MILWAUKEE, WISCONSIN.

ADJUSTABLE HEADLIGHT.

1,177,866.   Specification of Letters Patent.   Patented Apr. 4, 1916.

Application filed December 23, 1915. Serial No. 68,386.

*To all whom it may concern:*

Be it known that I, FREDERICK F. JOHN, a citizen of the United States, and resident of Milwaukee, in the county of Milwaukee and State of Wisconsin, have invented certain new and useful Improvements in Adjustable Headlights; and I do hereby declare that the following is a full, clear, and exact description thereof.

My invention has for its object to provide for electro-mechanical control of vehicle headlights on vertical and horizontal axes, said invention consisting in what is herein particularly set forth with reference to the accompanying drawings and pointed out in the claims of this specification.

Figure 1 of the drawings represents a plan view of a pair of pivotal headlights and means in accordance with my invention for electro-mechanical adjustment of the headlights on vertical and horizontal axes; Fig. 2, a front elevation of the same; Fig. 3, a side elevation thereof; Fig. 4, a partly sectional view illustrating a pair of solenoids and a core common to both constituting part of the electro-mechanical means for adjusting the headlights on vertical axes, and Fig. 5, a similar view illustrating another pair of solenoids and a core common to both constituting part of electro-mechanical means for adjusting the headlights on a horizontal axis.

The headlights are mounted in brackets each having a pivot-shank for which ball-bearings are preferable. The bearings are in connection with a carrier on a horizontal axis in other suitable bearings fastened to the frame of an automobile or other vehicle.

From the foregoing it will be understood that the headlights are mounted so as to provide for a swing of the same on vertical axes to the right or left out of normal position, or on a horizontal axis up or down from said position, and the right or left adjustment may be combined with an up or down adjustment of said headlights.

The right or left adjustment of the brackets and headlights therewith is due to the energization of one or the other of a pair of solenoids that are shown attached to the rotary adjustable carrier, a core common to both solenoids being in link and lever connection with said brackets. The up or down adjustment of the brackets and headlights is due to the energization of one or the other of another pair of solenoids attached to the vehicle frame, and a core common to both these solenoids is in lever connection with the aforesaid carrier.

The headlights are adjustable out of normal position against spring-resistance, the springs being preferably arranged in the solenoids, expansive force of one or more of said springs serving to automatically return said headlights to said normal position.

Each solenoid is in independent switch-controlled circuit with an electric-battery or other source of electricity. To swing the headlights to the right or left or up or down, the proper switch is closed, and it is obvious that a combined side and up or down adjustment of the lights may be effected by successively closing two of the switches.

Referring by figures and letters to the drawings, $a$ represents each of the headlights having a supporting bracket $b$ provided with a pivot-shank engaging a ball-bearing socket $c$ attached to one end of a carrier $d$ that of itself is rotarily adjustable in ball-bearing extremities $f$ of brackets $e$ fastened to the frame of an automobile or other vehicle.

Rotary adjustment of the headlights in one direction, on vertical axes depends upon the energization of a solenoid $g$, and in the opposite direction it depends upon the energization of a solenoid $h$, there being a core $k$ common to both solenoids and connected by links $i$ to lever-arms $j$ of the brackets $b$.

The up or down adjustment of the headlights on a horizontal axis depends upon the energization of a solenoid $l$ or $m$, a core $n$ common to both solenoids being in connection with a lever-arm $o$ of one of the ball-bearing sockets $c$. Loose play engagement of the lever-arm $o$ with a slot in the solenoid core $n$ is indicated in Fig. 5.

Core-opposing springs $p$ are shown in the solenoids and each solenoid is wired in circuit with an electric-battery $r$. The several switches are in connection with a plate $s$ and indexed R, L, U, D, according to their arrangement for controlling the right or left, or up or down adjustment of the headlights. A throw-out switch common to all the others aforesaid is indicated at $q$ central of the aforesaid plate.

I claim:

1. A headlight pivotally adjustable on vertical and horizontal axes, solenoids in pairs, a core common to each pair of solenoids, headlight adjusting mechanism in connection with each core; and means for independent energization of the several solenoids.

2. A headlight pivotally adjustable on vertical and horizontal axes, solenoids in pairs, a spring-controlled core common to each pair of solenoids, headlight adjusting mechanism in connection with each core; and means for independent energization of the several solenoids.

3. A carrier adjustable on a horizontal axis, headlight supports having pivot-shanks for which the carrier is provided with normally vertical bearings, a pair of solenoids, a core common to both solenoids, adjusting mechanism connecting the core and said supports, another pair of solenoids having a core common to both in lever connection with said carrier, and means for independent energization of the several solenoids.

In testimony that I claim the foregoing I have hereunto set my hand at Milwaukee, in the county of Milwaukee and State of Wisconsin, in the presence of two witnesses.

FREDERICK F. JOHN.

Witnesses:
   NICK EWENS,
   JOHN F. HOLUB.